(12) United States Patent
Bentley et al.

(10) Patent No.: US 9,100,546 B2
(45) Date of Patent: Aug. 4, 2015

(54) TIME SHIFTING IN TELECONFERENCES CONDUCTED WITHIN VIRTUAL WORLDS

(71) Applicant: Avaya Inc., Basking Ridge, NJ (US)

(72) Inventors: Jon Louis Bentley, New Providence, NJ (US); Parameshwaran Krishnan, Basking Ridge, NJ (US); Peter Tarle, Ontario (CA)

(73) Assignee: Avaya Inc., Basking Ridge, NJ (US)

( * ) Notice: Subject to any disclaimer, the term of this patent is extended or adjusted under 35 U.S.C. 154(b) by 166 days.

(21) Appl. No.: 13/762,452

(22) Filed: Feb. 8, 2013

(65) Prior Publication Data

US 2014/0028789 A1 Jan. 30, 2014

Related U.S. Application Data

(60) Provisional application No. 61/675,551, filed on Jul. 25, 2012.

(51) Int. Cl.
*H04N 7/14* (2006.01)
*H04N 7/15* (2006.01)
*H04M 3/56* (2006.01)

(52) U.S. Cl.
CPC .............. *H04N 7/155* (2013.01); *H04M 3/56* (2013.01)

(58) Field of Classification Search
USPC ....................................................... 348/14.01
See application file for complete search history.

(56) References Cited

U.S. PATENT DOCUMENTS

| | | | |
|---|---|---|---|
| 7,533,146 B1 | 5/2009 | Kumar | |
| 7,603,411 B1 * | 10/2009 | Davies et al. | 709/204 |
| 7,679,637 B1 * | 3/2010 | Kohler | 348/14.01 |
| 7,945,622 B1 * | 5/2011 | Pegg | 709/204 |
| 2003/0220973 A1 | 11/2003 | Zhu et al. | |
| 2004/0010599 A1 | 1/2004 | Otobe | |
| 2009/0300520 A1 * | 12/2009 | Ashutosh et al. | 715/756 |
| 2009/0307189 A1 * | 12/2009 | Bobbitt et al. | 707/101 |
| 2009/0327425 A1 * | 12/2009 | Gudipaty | 709/205 |
| 2011/0154204 A1 | 6/2011 | Narayanaswamy | |
| 2011/0271209 A1 | 11/2011 | Jones et al. | |
| 2012/0144320 A1 * | 6/2012 | Mishra et al. | 715/753 |

(Continued)

FOREIGN PATENT DOCUMENTS

WO 2011136794 A1 11/2011

OTHER PUBLICATIONS

Combined Search and Examination Report—GB 1310987.1 dated Nov. 28, 2013, 9 pages.

*Primary Examiner* — Maria El-Zoobi
(74) *Attorney, Agent, or Firm* — Maldjian Law Group LLC

(57) ABSTRACT

System and method to provide an immersive virtual world conference environment, the method including: establishing a live virtual world conference, by use of a virtual world server; recording, in a memory coupled to the virtual world server, events related to live participants in the live virtual world conference, wherein the live participants are communicatively coupled to the virtual world server; receiving a request from a first virtual user to experience the virtual world conference at a predetermined virtual time that is different than a present real time; retrieving from the memory events related to live participants that occurred no later than the predetermined virtual time; restoring a conference state based upon the retrieved events; and providing an interaction responsive to the conference state and the first virtual user, in order to produce the immersive virtual world conference state.

18 Claims, 4 Drawing Sheets

(56) References Cited

U.S. PATENT DOCUMENTS

2012/0163576 A1 6/2012 Bentley et al.
2013/0194378 A1 8/2013 Brown
2013/0339431 A1* 12/2013 Yannakopoulos et al. .... 709/204

* cited by examiner

100

400

TIME SHIFTING IN TELECONFERENCES
CONDUCTED WITHIN VIRTUAL WORLDS

CROSS-REFERENCE TO RELATED APPLICATIONS

This application claims the benefit of U.S. Provisional Patent Application Ser. No. 61/675,551, filed on Jul. 25, 2012, the entire content of which is hereby incorporated by reference in its entirety.

BACKGROUND

1. Field of the Invention

System and method for time shifting the participation by a user in a recorded virtual-world teleconferencing session.

2. Description of Related Art

It is known that audio conferences may be recorded for subsequent listening. Tagging the audio (i.e., associating a marker with a particular location of the recording, or noting a position in the recording by way of a time marker, position marker, or the like) helps a listener to identify interesting portions. Devices such as TiVo™ are able to record television shows and simultaneously play back recorded portions of the television show in real time.

SUMMARY

Embodiments in accordance with the present invention provide to a user a much more completely immersive involvement in the virtual environment than other systems. Instead of merely passively watching a recorded virtual world conference, the user may experience the virtual world conference as if they were participating in it live.

Embodiments in accordance with the present invention may provide a method to provide an immersive virtual world conference environment, the method including: establishing a live virtual world conference, by use of a virtual world server; recording, in a memory coupled to the virtual world server, events related to live participants in the live virtual world conference, wherein the live participants are communicatively coupled to the virtual world server; receiving a request from a first virtual user to experience the virtual world conference at a predetermined virtual time that is different than a present real time; retrieving from the memory events related to live participants that occurred no later than the predetermined virtual time; restoring a conference state based upon the retrieved events; and providing an interaction responsive to the conference state and the first virtual user, in order to produce the immersive virtual world conference state.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
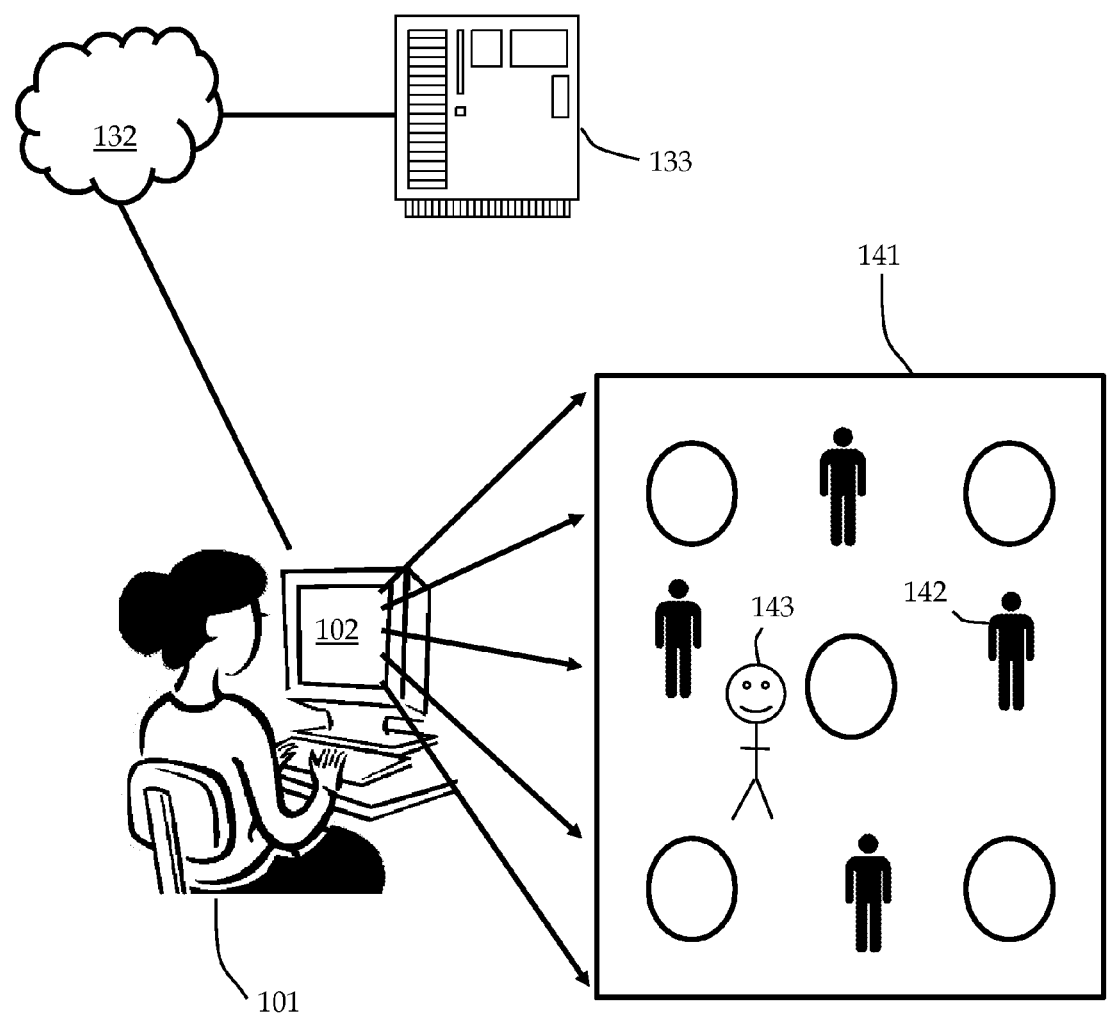
FIG. 1 illustrates a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize virtual web conferencing.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

Virtual world conference systems such as AvayaLive Engage™ (formerly Avaya web.Alive™) are able to connect real people in real time by providing an immersive user experience for collaborative projects. Embodiments in accordance with the present invention provide a virtual world conference such that a user may shift their point of reference in time backward to a previously recorded point in the virtual world conference, or forward in order to reserve or bookmark participation in the virtual world conference at a future point in time. In this way, embodiments in accordance with the present invention in effect are able to replace the present time reference of a virtual world conference user from being only in real time, to also be at an arbitrary reference point in time.

In a virtual world conference, events and interactions among participants, and the position and appearance of the participants' avatars, may be recorded from the perspective of each participant, as one or more media streams. Embodiments in accordance with the present invention are able to replay the virtual world conference, for the benefit of a later participant, from the perspective of substantially any vantage point within the virtual world conference, including vantage points that do not correspond to the vantage point of a single media stream.

A user may interact with a virtual world conference as known in the art in two distinct modes: as an active participant, interacting with other people in real time, or as a passive viewer of an immutable historical event.

In contrast, embodiments in accordance with the present invention may allow users of a virtual world conference to visit and interact with the past history of the virtual world conference, at a past point in time, and then the visiting users may fast-forward and interact with later points in time of the virtual world conference, beyond the past point in time, up to the present point in time.

Interacting with the Past History of a Virtual World Conference

Suppose that a very large (e.g., thousand-person) virtual world conference has taken place in a virtual world, mimicking a physical conference taking place in a physical conference center. Formal presentations may be given in large ballrooms of the virtual world conference to hundreds of people, less formal talks are given in small rooms of the virtual world conference to dozens of people, while groups ranging in size from two to ten mingle in the halls and chat informally within the virtual world conference. Suppose further that an attendee attends a good talk that is followed by a spectacular question-and-answer session. The attendee may later meet another person (e.g., a good friend) either in the real world or the virtual world whom the attendee knows would have wanted to attend the session. Therefore, a need exists for the attendee to be able to share the virtual world conference experience with another person.

In virtual world conference systems as known in the art, one or more users who want to repeat a virtual world conference experience might leave an immersive and responsive virtual world and enter a pre-recorded virtual world generated by a virtual world player that merely repeats recorded history, similarly to watching a TV program recorded on a VCR, DVD, or TiVo. Even if multiple users enter the pre-recorded virtual world at the same time, their experiences are independent, i.e., they experience the pre-recorded virtual world separately. There is no interaction among visiting users, or between a visiting user and the pre-recorded virtual world, unless that interaction was already recorded in the pre-recorded virtual world. Accordingly, a visiting user is no longer as immersed in the virtual world experience.

Embodiments in accordance with the present invention use an alternative approach to re-experiencing the history of the virtual world. Visiting users who want to experience a more immersive history of the virtual world, either individually or with other visiting user(s), may stay in the immersive virtual world and together shift back through the history of the virtual world to a desired point in time. The virtual world may then be experienced jointly and responsively by the visiting user(s). Jointly in the sense that the visiting users are able to interact with one another based at least in part upon the recorded history of the virtual world. The virtual world may be experienced responsively in the sense that at least a presented view of the recorded virtual world may change according to actions taken by the visiting users. Although the underlying recorded virtual world from which the presented view is derived does not change, actions of visiting users and interactions among visiting users may change and presented views thereof may change if such change does not affect the recorded virtual world.

From the viewpoints of the visiting users, the visiting users may continue to interact with each other just as if they were in a real-time immersive virtual conference. In accordance with an embodiment of the present invention, the visiting users can navigate around the virtual world environment, and observe the recorded virtual world and the historical figures therein similarly to a user who may have been in the virtual world contemporaneously with its recording. However, the visiting users are not able to influence or change the recorded history of what happened in the virtual world.

Avatars of users who visit the recorded virtual world may be rendered, depicted, or otherwise visually appear similar to other avatars in the recorded virtual world (e.g., displayed in traditional colors, etc.), but this might lead to awkward interactions between visiting users and historical figures in the recorded virtual world who are oblivious to the presence of later visiting users. Multiple visiting users may find it difficult to interact with another visiting user if it is difficult to tell apart a visiting user from a historical figure.

Embodiments in accordance with the present invention may attempt to render, depict, or otherwise indicate a difference between avatars of historical figures recorded in the virtual world, and avatars of later users visiting the recorded virtual world from a later point in time. For example, embodiments in accordance with the present invention may render avatars of the historical figures in their traditional colors, and render avatars of visiting users as semi-transparent or in subdued shades (e.g., grey and white at an extreme) in order to emphasize their nonhistorical and visiting status. Alternatively, avatars of the historical figures may be rendered semi-transparently or in subdued colors and avatars of the visiting users may be rendered in normal color or form. Rendering avatars of visiting users in normal color or form may facilitate the meeting and interaction in the virtual world of one visiting user with another visiting user.

Embodiments in accordance with the present invention may provide one or more points of view calculated from the recorded history of the virtual world conference, as recorded from the points of view of, and by the actions of, the conference participants at the time. The calculated points of view may be interpolated or extrapolated from the available recorded points of view. The calculated points of view may represent a later visiting user who is time-shifting in order to experience the history of the virtual world conference as a historical event.

Embodiments in accordance with the present invention may use a "virtual world server" in order to interpolate or extrapolate a point of view by knowing the placement, actions and timing of avatars (users), objects and events in the virtual conference, and calculating (e.g., by raytracing) a view from a desired vantage point. The virtual world server may also be referred to herein as a virtual world engine. Conversations may be calculated as a weighted average of conversations from nearby users or avatars. Weighting (i.e., volume level) may be determined by physical proximity, acoustic obstructions or enhancements (e.g., walls or reflective surfaces), simulated acoustic characteristics (e.g., tile floor vs. carpeted floor), and so forth. Conversations which are intended to be private may be marked as private by at least one of the participants, after which the conversation will be muted to non-participants.

Embodiments in accordance with the present invention may allow a visiting user to discontinuously shift backward or forward through the recorded time of the virtual conference, and into the future relative to the present real time for certain purposes (e.g., reserving a spot to attend a future event). A visiting user may also be able to experience the recorded conference at a pace that is faster or slower than real-time.

Embodiments in accordance with the present invention may provide for a guided tour or the like through the recorded history of the virtual world conference. This might be used, for instance, to review and comment on noteworthy points of a virtual conference, provide relevant background material related to topics discussed during the virtual conference, and the like.

Interacting with and Changing the Past History of a Virtual World Conference

If a virtual world conference is conducted once and then viewed once, there is little ambiguity about what is meant by time shifting. However, if there are multiple visiting users to the recorded history of the virtual world conference, embodiments in accordance with the present invention provide various options regarding how the visiting users may interact with each other, and how the visiting users may change or depart from the recorded history (i.e., the primary events) of the virtual world conference. Primary events are unchanged, but events not dependent upon or not inconsistent with the primary events (e.g., interactions with visiting users) may be changeable.

In accordance with an embodiment of the present invention, visiting users do not change the recorded history of the virtual world conference. Each visiting user interacts with the virtual world conference with the same recorded history. Embodiments may allow for two or more visiting users who are visiting the virtual world conference at the same real time to interact with each other. Embodiments may further allow for presently-visiting users to view previously-visiting users who visited the same point in the virtual world conference history. Some embodiments in accordance with the present invention may allow selectively including some previously-visiting users to be visible to later-visiting users, and be able to comment on the activity in the virtual world conference for later viewing.

In some embodiments, the point in the recorded history to which the visiting users visit may be considered as a new starting point (i.e., a restarting point), from which the recorded history of the virtual world conference is a guide from which minor departures are acceptable. A minor departure may be, for example, if an avatar is idle then a visiting user may have interactions with the otherwise idle avatar that uses script or dialog within the knowledge of the virtual world conference (e.g., asking questions about agenda, speakers, objective observations about the virtual world conference, etc.). Such minor departures may initially be limited to situations in which the interactions do not involve other avatars and do not interfere with other interactions recorded in the virtual world conference. The minor departures represent new events that are not synthesizable solely from the recorded events of the virtual conference, but rather depend in part upon interactions between the visiting user and the recorded events. If such minor departures start to be affected by the limitations, the avatar may be programmed to politely discontinue the minor departure.

In other embodiments in accordance with the present invention, the virtual world conference history may be accretive, such that each visiting user to the recorded history is added to the record of that history. The system may note both the virtual time and the real time of each such event. For examples, embodiments may allow a future visiting user at 9:00 real time to request to "visit this room at 2:00 virtual time as it appeared at 7:00 real time," and so on.

Choices regarding how presently-visiting users are allowed to interact with, and depart from, the recorded history of the virtual world conference may be predetermined by the original builder of the system (e.g., in order to apply to all virtual world conferences), or various options may be configurable by a later system administrator or conference organizer. Other options that may be either predetermined but fixed, or configurable, may include (for example) whether earlier visiting users are allowed to leave any evidence of their visit for finding or discovery by later visiting users (i.e., "footsteps in time"). Such a capability would involve a first visiting user being able to persistently modify a state of the conference, e.g., modify the conference state such that the modified state, or sufficient modified events that can be used to recreate the modified conference state, are saved and the modified conference state be used or presented to a later visiting user. Other options may control whether private conversations may be overheard in the future by a future visiting user.

Forward Time-Shifting to a Later Point in a Virtual World Conference

In some embodiments in accordance with the present invention, users may visit a later point in the recorded history of the virtual world conference to influence the virtual world conference but not observe it.

For example, a speaker at a virtual world conference may be scheduled to give a speech at 3:00 PM. Later, the speaker may become unable to keep the scheduled obligation at the scheduled time—for example, a higher-priority conflicting matter may have arisen for the scheduled time. However, the speaker may time-shift forward to the scheduled time and present the speech in an immersive virtual environment that has been predicted and generated by the virtual world server to be representative of the scheduled time, so that the speech can be recorded and then presented at the virtual world conference at the previously-scheduled time. Additional persons may be included in the recording who help in some way (e.g., operate a demonstration, act as audience, etc.). The time-shifted speech may then be presented at the scheduled time or any appropriate time (e.g., after the previous speaker has finished, which may be before or after the scheduled time). The other participants of the virtual world conference will be able to view the speaker and be influenced by the speaker, but interaction between the time-shifted speaker and the live virtual world conference users will not be possible unless the interaction itself was part of the recording (e.g., from the additional persons acting as an audience). By this method described above, the speaker is in the same environment when he gives the speech as when the speech is scheduled to be delivered, so the experience of presenting the speech is immersive for the speaker, and as a result the experience more immersive for the listeners as well when they listen to the speech. Such a feature may be referred to herein as forward time shifting.

Forward time shifting may be used to present introductory remarks, e.g., by using the introductory remarks to prepare the speaking environment for a subsequent real-time presentation in the virtual world conference. Forward time-shifting may be used to make a presentation if there are no interdependencies with previous presentations, or if interdependencies are limited to being with advance copies of a previous presentation (e.g., "I didn't see the talk, but based on the paper . . . "). Forward time-shifting may be used to present remarks that have been prepared in advance and which are intended to be presented only upon the occurrence of a prerequisite or triggering event. For example, certain questions may be anticipated, and remarks be prepared in advance to address the anticipated questions. Such remarks prepared in advance may be triggered by, e.g., keywords or by a person authorized to activate the responses. Other remarks prepared in advance may be triggered by predictable or anticipated events (e.g., "I see that we are approaching 4:00, so let me summarize.").

Embodiments in accordance with the present invention may also provide a visiting user with an ability to reserve attendance at a future place and time in the virtual world conference, e.g., at a scheduled presentation. For example, the visiting user may leave the current time and time-shift forward to a scheduled start time and location of a presentation that the user wants to attend. Since this is a future event that the visiting user is attending, there will be no interactions with other avatars unless the other avatars represent visiting users who also have time-shifted forward. The avatar of the time-shifted user may wait at the scheduled location, while the real user himself may able temporarily disconnect from the virtual world conference. When the presentation is about to begin, the real user may be contacted by the virtual world conference system in order to re-connect to the virtual world conference and virtually attend the presentation that the user wants to see.

Embodiments in accordance with the present invention may combine forward and backward time shifting in order to implement an interactive conversation that appears to be in real time but was implemented by a series of time-shifted segments.

Alternative Conferencing Systems

Embodiments in accordance with the present invention have been described herein with respect to an immersive virtual world conference system populated with avatars, such as found in virtual world servers such as AvayaLive Engage. Other embodiments in accordance with the present invention may be implemented during a video conference in which participants are represented in other ways, such as individualized video feeds for participants. For example, two participants among a plurality of participants may agree to time-shift to a different point in the history of the virtual world conference in order to discuss or interact with the history of the virtual world conference as it happens, e.g., as it is replayed. Rather than viewing the history of such a conference as canned forever and viewed dispassionately in the future, backwards time shifting could give reviewers an immersive "you were there" feel of the conference. And forward time shifting in this context allows users to express opinions when they are otherwise constrained and therefore not able to attend in person.

Embodiments in accordance with the present invention may provide methods to give a guided tour of the past history of the virtual world conference. For example, a virtual guide may move through at least a portion of the virtual world conference, and a later visiting user is able to see that world through the viewpoint of the virtual guide. For example, the virtual guide may move through the virtual world conference either in real time or after the events during the virtual world conference have transpired. The resulting view by the virtual guide may offer much of the immersive experience of the virtual world conference without requiring sophisticated navigation on the part of the user. In addition to playing back the video and audio streams from the guide's point of view, the user might be able to "turn the guide's head" to look in different directions, thereby providing additional views derived from the recorded history of the virtual world conference.

When a user is time shifting in the virtual world conference, embodiments in accordance with the present invention may depict other users who are currently experiencing the virtual world conference in a time-shifted manner at or near the same time-shifted time. A policy-based display may allow users to become synchronized and move in time to together experience events of the virtual world conference. For instance, if user "A" becomes aware of user "B" 15 minutes ahead in the virtual world conference, user "A" may communicate with user "B" in real time (i.e., outside the virtual world conference), find out what transpires during the 15 minute difference in time, and then move ahead in time to join user "B" temporally.

Implementation Issues

Embodiments in accordance with the present invention may be provided by a virtual world server that receives as input a series of commands (mouse clicks, text, DTMF tones, etc.) and media streams from a user, and produces as output a series of commands and media streams. The history of the virtual world conference can be recorded by recording the complete set of input, i.e., the series of commands and the media streams. Systems and methods described herein may be adapted for use in a conferencing environment that does not depend upon a virtual world user interface. For example, simpler audio, audio-video and/or collaborative conferences may benefit from adaptation of the concepts herein. For ease of reference, such conferences and the server(s) serving them may be referred to herein as a virtual world conference, and a virtual world server, respectively.

Embodiments in accordance with the present invention may implement backward time shifting by moving to a predetermined point within the input media streams, and feeding all of the historic series of commands into the virtual world server, along with the new series of commands and/or media streams. Embodiments in accordance with the present invention may conserve processing power and system resources by computing only the output media stream(s) that are being viewed. As a further optimization, embodiments in accordance with the present invention may ignore the inputs and outputs of all historic participants that are not visible to any current participant, although their state may continue to be computed and tracked in case they become relevant to the viewed media output.

When backward time shifting, embodiments in accordance with the present invention may be able to allow a visiting user to provide a search term, and then the virtual world server will be able to time-shift the recorded history of the virtual world conference to points in time and locations within the virtual world conference where the search term appears, or was spoken, or appeared in a presentation, and so forth.

Embodiments in accordance with the present invention, when time-shifting backward, may allow some informational content to be updated. For example, if a visiting user visits a presentation, the presentation may be updated to provide updated or additional (i.e., augmented) content developed after the original date of the virtual world conference.

Embodiments in accordance with the present invention may feed to the virtual world server only the single historic input stream and the input streams from the current set of users. Other embodiments in accordance with the present invention may feed to the virtual world server both the primary historic stream and the streams of selected other users as well.

Embodiments in accordance with the present invention may implement forward time shifting by running the virtual world server with an appropriate time parameter (i.e., virtual world clock), and recording the input streams. When the real time equals the virtual world time, then those inputs are once again fed into the virtual world server along with the inputs of the current participants.

Other Considerations

Embodiments in accordance with the present invention model a self-contained virtual world, and what a system such as AvayaLive Engage™ can do is record actions of each user. The system records substantially everything—for every user, record where he was, what he said, and so forth. There can be a substantially unlimited number of views of interaction that happen. For example the number of views in one place may be viewed from straight ahead, from the right, from the left, from an arbitrary azimuth and elevation angle, etc. Therefore, by recording the actions of a user rather than recording the views or situations that result from those actions, additional views or situations may be synthesized (e.g., calculated from the actions) or derived (e.g., interpolated or extrapolated as predictable results) from the recorded actions. The virtual world engine may be used to synthesize the interpolated or extrapolated views or situations.

Embodiments in accordance with the present invention do not necessarily record the view of a user, but rather the embodiments concentrate on recording the history of the user's actions. For example, a large conference may be taking place in AvayaLive Engage™ in a setting like a conference hall, such that there are small clusters of people talking, while at the same time there is a concurrent main meeting with the main focus what's going on in the conference hall by the main cluster of users. There may also be side meetings in another room with small clusters of users. But in each of these clusters of users, the conferencing system is recording actions of the users. The recorded actions can be later manipulated to form additional views.

For example, if the actions of four original users walking around or conversing were recorded, then a fifth user (representing a later visiting user) could view the first four users from a variety of different angles and views, as synthesized or derived from the recorded actions of the first four users. Other views may be derived, such as a view from above (e.g., bird's eye view), or from outside the conference, or rip off the top off the building for a view like a cross-sectional view or a blueprint view, zoom in or out on any view, provide views from security cameras, etc.

Embodiments in accordance with the present invention may operate by recording not a view of any particular user, or any separate users, but rather by recording the actions of the whole virtual world, for later play back by the virtual world server. Embodiments record histories of users (e.g., user actions and interactions), for later use in synthesizing or deriving a view.

Whether a user may change or depart from the recorded history of actions by users is a subject of different embodiments. In one embodiment, a user cannot change the history. The past is immutable. Each later visiting user experiences views synthesized or derived from the same set of recorded actions. In some embodiments, if two or more visiting users visit the virtual world at the same virtual time, then they may (or may not) have an ability to interact with each other, independently to the recorded actions of previous original users.

For example, suppose a topic is presented from 1:00 pm-4:00 pm, and a first visiting user goes back to virtually visit the conference at the virtual time of 4:02 pm and stays until the virtual time of 4:30 pm. Later, a second visiting user may go back to virtually visit the conference at the virtual time of 4:10 pm. In one embodiment, the second user does not see or experience the first user, regardless of whether or not the first and second visiting users overlapped in real time. Nor would the second user experience the first user if the second user visited after the first user had already visited (i.e., the first user left no evidence or record of their earlier visit).

In other embodiments, the recorded history may be mutable. If two visiting users are visiting the same virtual time at the same real time, then a bi-directional interaction is possible since they can interact with each other at the same real time. If the two visiting users are visiting the same virtual time but at different real times, then they cannot fully interact with each other—they can interact in a uni-directional manner—since the later visitor knows what the earlier visitor did, but not vice versa. For example, the first visiting user and the second visiting user may be able to interact, at least bi-directionally in real time if the virtual visits coincided in real time, and perhaps also be able to interact (perhaps uni-directionally) if the real times of the virtual visits do not overlap. The uni-directional way of interacting may be, e.g., the second virtual user is aware of the first virtual user but not vice versa, or the interactions by the first virtual user toward the second may include only predictable actions (e.g., collision avoidance, answering simple questions within the knowledge of the virtual world, etc.).

In an example of the bi-directional embodiment of mutable history, the first and second visiting users may be aware of each other, be able to interact and communicate about other events in the virtual conference, and be able to jointly time-shift to a mutual virtual time in the virtual conference in order to experience the virtual conference together at that virtual time. Separate processes may be implemented in the virtual world server to support the interactions.

Embodiments in accordance with the present invention may record the state of the virtual conference for later resumption, or at important junctures of the virtual world conference. States may be reloaded in the virtual world server so that visiting users may experience the virtual conference as if they had, e.g., taken a different set of actions after the point at which the state was saved, or visited at a different virtual time. State may include (for each virtual user and/or object as applicable) a location, appearance, orientation, direction and speed of travel, direction of vision, active conversations, location within their media stream, and so forth, as determined by the virtual world server. A state may include states of included items, e.g., a state of a sidebar room may include the states of participants and objects within the sidebar room. The state of the entire system includes all media streams and the state of all participants and objects. A state may be considered to be a snapshot view of the cumulative result of user histories to that point in time at which the state was recorded.

For example, suppose a visiting user visits a virtual conference at a predetermined historical point in time, e.g., to view a presentation that occurred from 3:00-4:00 pm. The virtual world server has the history that happened in the virtual conference at that time, including the inputs from users at that time. This history may be referred to as the immutable history (i.e., the real, original history as the virtual conference originally took place). When the visiting user time shifts to that point in time, the virtual world server provides to the visiting user the immutable history, plus handles the visiting user's interaction with the immutable history. The immutable history may not change in response to the visiting user's actions, but the visiting user's actions and effects may become part of or change the immutable history from that point forward. A later visiting user may then view the combination of the original immutable history plus the cumulative effects of any previous visiting users, similar to a combination or superposition. Alternatively, the later visiting user may view the immutable history without observing other previous visiting users.

Embodiments in accordance with the present invention may allow a user to proceed at a faster or slower pace through the virtual world than had been originally recorded. Separate displays may be provided to show the time and the pace relative to real time (e.g., 120%, 1.2×, 90%, 0.9×, etc.).

Embodiments in accordance with the present invention may implement the virtual world playback conceptually as a series of layers. The originally recorded virtual conference may be handled as a base layer. A later visiting user may be treated as occurring on a different layer that is superimposed on the base layer. Additional visiting users may be treated as occurring on additional, separate layers that may be superimposed on other layers, particularly if there is no interaction among visiting users. Alternatively, additional visiting users may be treated as being inserted into a user layer (above the base layer), which is to be superimposed on the base layer, particularly if interaction among visiting users is allowed. Layers may be scrollable and moveable to the extent available from the recorded history of events and/or virtual world server implementation limits.

In another usage scenario in accordance with an embodiment of the present invention, suppose that a group of users are experiencing a virtual conference at a first point in time-space, the point represented by at least a time and a location in the virtual conference. Further suppose that at some later point if one of the group of users decides to time-shift to a different point in the virtual conference, the remaining members of the group of users may experience a sudden departure of the time-shifting virtual user. If the returning time-shifting user may want to be apprised of what transpired in the group of users while the time-shifting user had temporarily been gone. In some embodiments the returning time-shifting user may be able to "rewind" enough to experience that history. In other embodiments, the returning time-shifting user will not be able to experience that history if it is marked as private among the remaining members of the group. Embodiments in accordance with the present invention may handle privacy and security issues as matters of parameterizable policy. For example, the policy may specify whether and how private conversations may be made available or denied to later visiting users, or usage of blacklists and/or whitelists for certain interactions like overhearing conversations, initiating conversations, etc.

Synchronization among visiting users may be handled in more than one way. Embodiments in accordance with the present invention may be able synchronize visiting times with other visiting users. For example, suppose a first user time shifts to a predetermined point in time. Then further suppose that one minute later a second user shifts in time to the same predetermined point in time. Meanwhile, the first user's clock has run forward by one minute, such that the first and second users are experiencing the virtual conference with a time offset determined by their relative delay in time shifting to the predetermined point in time. Embodiments in accordance with the present invention may be able to correct for this time offset by synchronizing the clocks of virtual users who desire to experience the virtual world together and/or interact with each other in the virtual world.

In other embodiments, if it is known that a group of users want to time-shift together into a virtual conference, a user may indicate a desire to time shift but the time shift itself may be delayed until all users from among the group of users has indicated a desire to time shift, at which time the group of users will time shift as a group rather than shifting individually. This will maintain synchronization among the group.

In other embodiment, if a later time-shifting user wants to join a previous time-shifting user, the later user may request to be joined to the user rather that shift to a particular time and/or location.

System Implementation

FIG. 1 illustrates a system 100 and usage thereof in accordance with an embodiment of the invention. System 100 illustrates a user 101 who is able to virtually attend an event by use of a virtual interface 141 illustrated on screen 102 of the computing device of user 101. Virtual space 141 may be a trade show, but embodiments in accordance with the present invention may be used with other types of gatherings, such as a symposium, a lecture, a retail store, a shopping mall, or other group of people. Virtual interface 141 is generated by a virtual world server 133, which is interconnected to the computing device of user 101 by use of a wide area network 132 (e.g., Internet or an intranet), as described below and as depicted at least within FIG. 1.

In other embodiments, virtual space 141 may represent more than one location. For instance, virtual space 141 may represent a plurality of booths at a convention or a plurality of stores in a shopping mall or a plurality of presentation rooms at a symposium, some of which may not necessarily be physically adjacent.

Movement and other actions of users within the virtual world are tracked by virtual world server 133, and a corresponding avatar 142 is moved accordingly in virtual interface 141. User 101 is represented in virtual interface 141 by another avatar 143. User 101 may be able to interact with other users within the virtual world by manipulating avatar 143 to interact with avatars 142.

The computing device of user 101 may include a processor, a memory coupled to the processor, a receiver, transmitter, and/or transceiver to couple an internal and/or external communication path to the processor, and/or one or more user input/output (I/O) devices (e.g., display screen, keyboard, mouse, etc.). The memory stores data and/or program instructions used by the processor. The memory may include permanent, non-volatile memory (e.g., ROM), or volatile memory (e.g., RAM), or rewritable memory (e.g., hard drive or flash memory), or any combination thereof. The program instructions, when executed by the processor, carry out the processes performed by the computing device of user 101.

Figure 2:
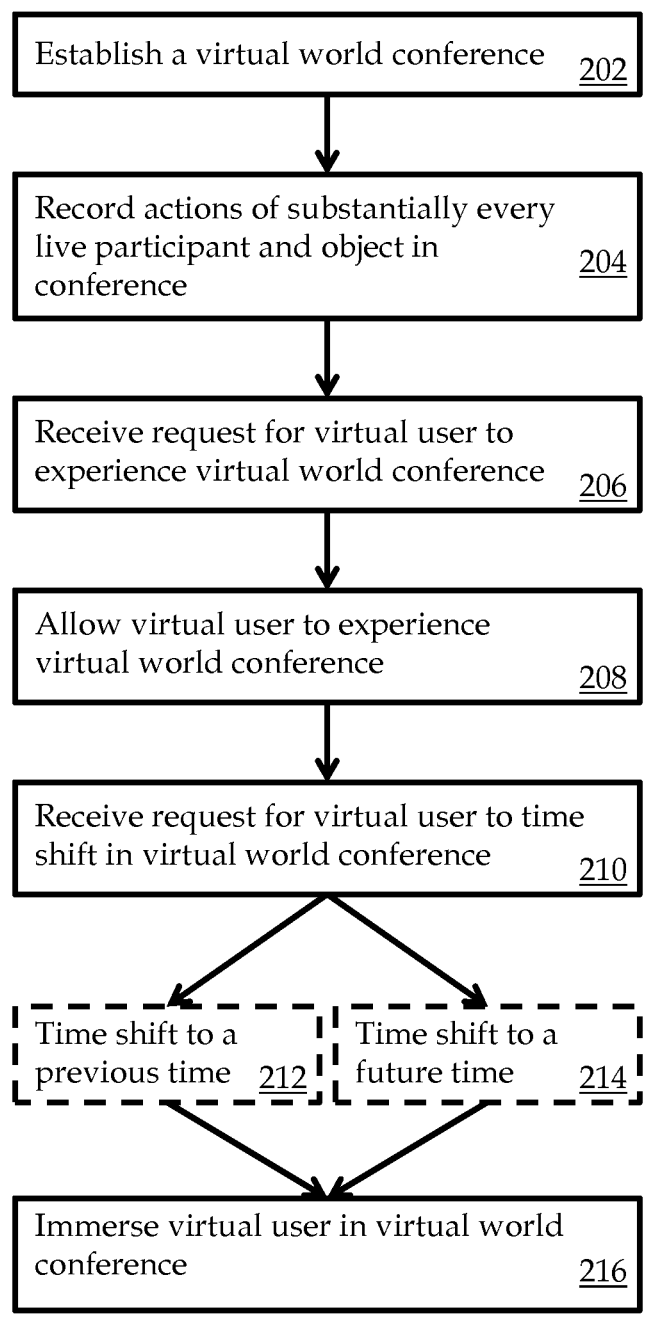
FIG. 2 illustrates a process in accordance with an embodiment of the present invention.

FIG. 2 illustrates at a high level of abstraction a process 200 in accordance with an embodiment of the present invention. Process 200 begins at step 202, at which an electronic conference is established. During establishing the conference, live participants communicate with a virtual world server 133 and present sufficiently valid credentials to join the conference. The virtual world server 133 will attend to establishing and maintaining sufficient communication and processing assets (e.g., a communication bridge, ports, processor processes, etc.) to support the conference. It should be understood that certain unillustrated sub-steps of step 202 may occur in an ongoing manner throughout process 200, such as managing live participants who enter and/or leave the virtual world conference while the conference is live.

Next, at step 204, the virtual world server 133 will record actions and state changes for substantially every live participant and object in the conference. For an object, this may include, e.g., changes in the state of the object upon interaction with a live participant or an avatar generated by the system. Step 204 is an ongoing sub-process that continues throughout substantially the duration of the virtual world conference.

Next, at step 206, the virtual world server 133 may receives a request from a virtual user to experience the virtual world conference. Ordinarily, step 206 will occur after the virtual world conference has concluded, because a virtual user who wants to participate in a live virtual world conference may join the virtual world conference in step 202. However, step 206 may accommodate a late-joining live participant who wants to review previous states of the live conference or its objects or other participants.

Next, at step 208, the virtual world server 133 allows the virtual user to immersively experience the virtual world conference. Ordinarily, the virtual conference will be presented starting at the beginning and will proceed at real-time speed.

The virtual world server 133 may later receive a request from the virtual user to change the virtual time, virtual location, and/or playback speed.

Next, at step 210, after the replay of the virtual conference has begun, the virtual world server 133 may receive from the virtual user a request to time shift to a different virtual time in the virtual conference. If the requested virtual time is a time backward, control of process 200 passes to step 212. If the requested virtual time is a time forward, control of process 200 passes to step 214.

At steps 212 and 214, the virtual world server 133 sets the virtual time to the past or future virtual time, respectively, requested by the virtual user. The virtual world server 133 will recall from memory sufficient events recorded from the then-live virtual world conference in order to recreate the state of the conference and its objects and then-live participants at the requested virtual time. Any requested future time ordinarily will not extend beyond the ending time of a concluded virtual world conference.

Next, at step 216, the virtual user is immersed in the recreated virtual conference at the requested virtual time.

Figure 3:
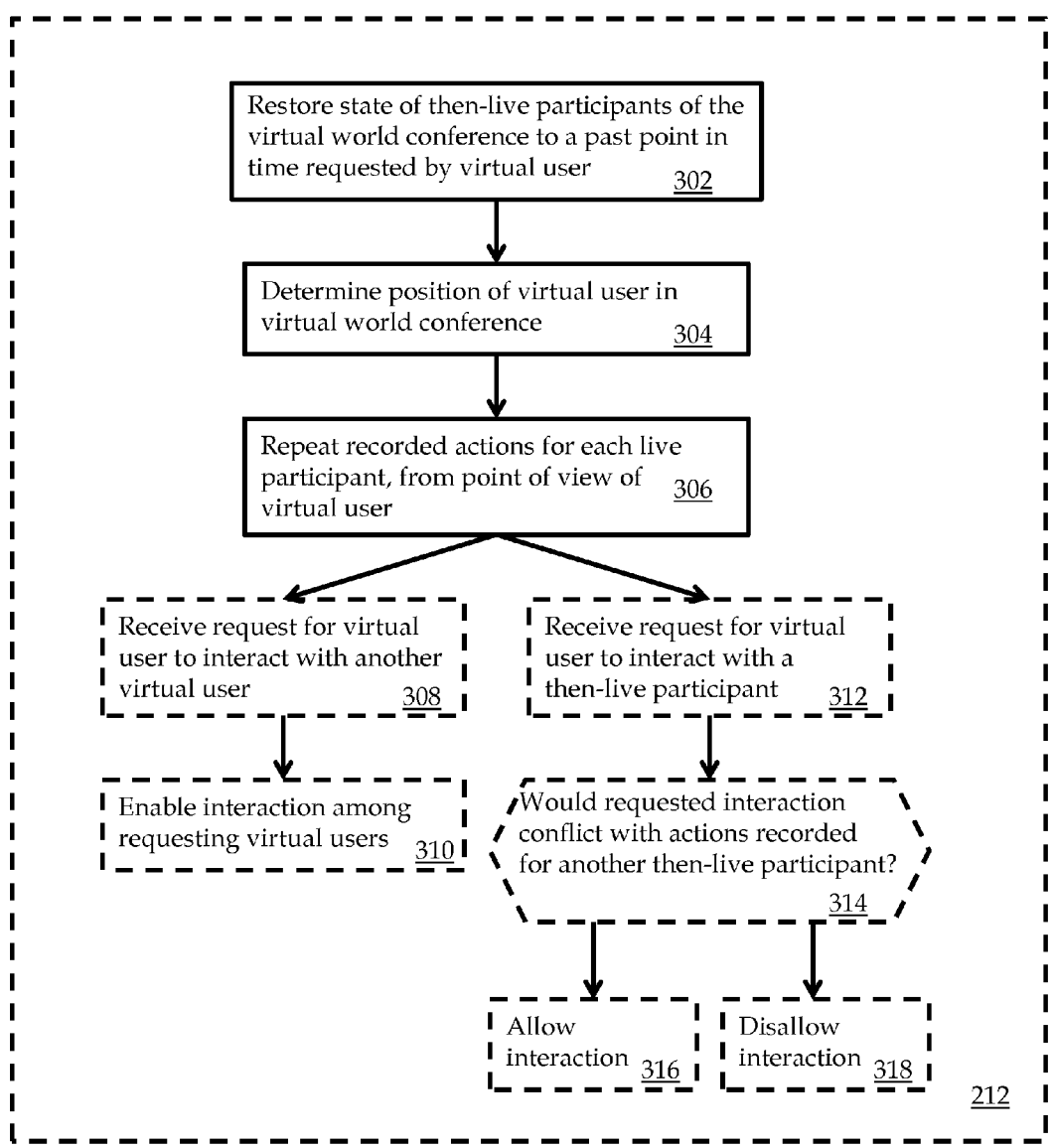
FIG. 3 illustrates a process to time shift to a previous time in accordance with an embodiment of the present invention.

FIG. 3 illustrates at a relatively lower level of abstraction a process 300 in accordance with an embodiment of the present invention, which may be useful to implement step 212 of process 200. First, at step 302, the virtual world server 133 restores the virtual conference and its then-live participants and objects to their respective states at the virtual time requested by the virtual user.

Next, at step 304, the virtual world server 133 may receive from the virtual user a signal that indicates that the virtual user is requesting to be placed at a predetermined location in the virtual world. The virtual world server 133 will recreate the relevant states using events recalled from memory.

Next, at step 306, the virtual world server 133 will restore and replay the virtual conference at the point of view of the virtual time and location requested by the virtual user. The point of view may be synthesized or derived as described earlier.

At step 308, the virtual world server 133 optionally may receive a request from the virtual user to interact with other virtual users, as described earlier. At step 310, the virtual world server 133 will enable the requested interaction as described earlier.

At step 312, the virtual world server 133 optionally may receive a request from the virtual user to interact with a then-live participant, an avatar of the then-live participant, another system-generated avatar, or the like.

At step 314, the virtual world server 133 may determine whether the interaction requested in step 312 is sufficiently minimal that the virtual world server 133 may alter the otherwise recorded history of the virtual conference in order to presently synthesize the requested interaction. If the result is that the requested interaction is allowable, control of process 300 passes to step 316. If the result is that the requested interaction is not allowable, control of process 300 passes to step 318.

Figure 4:
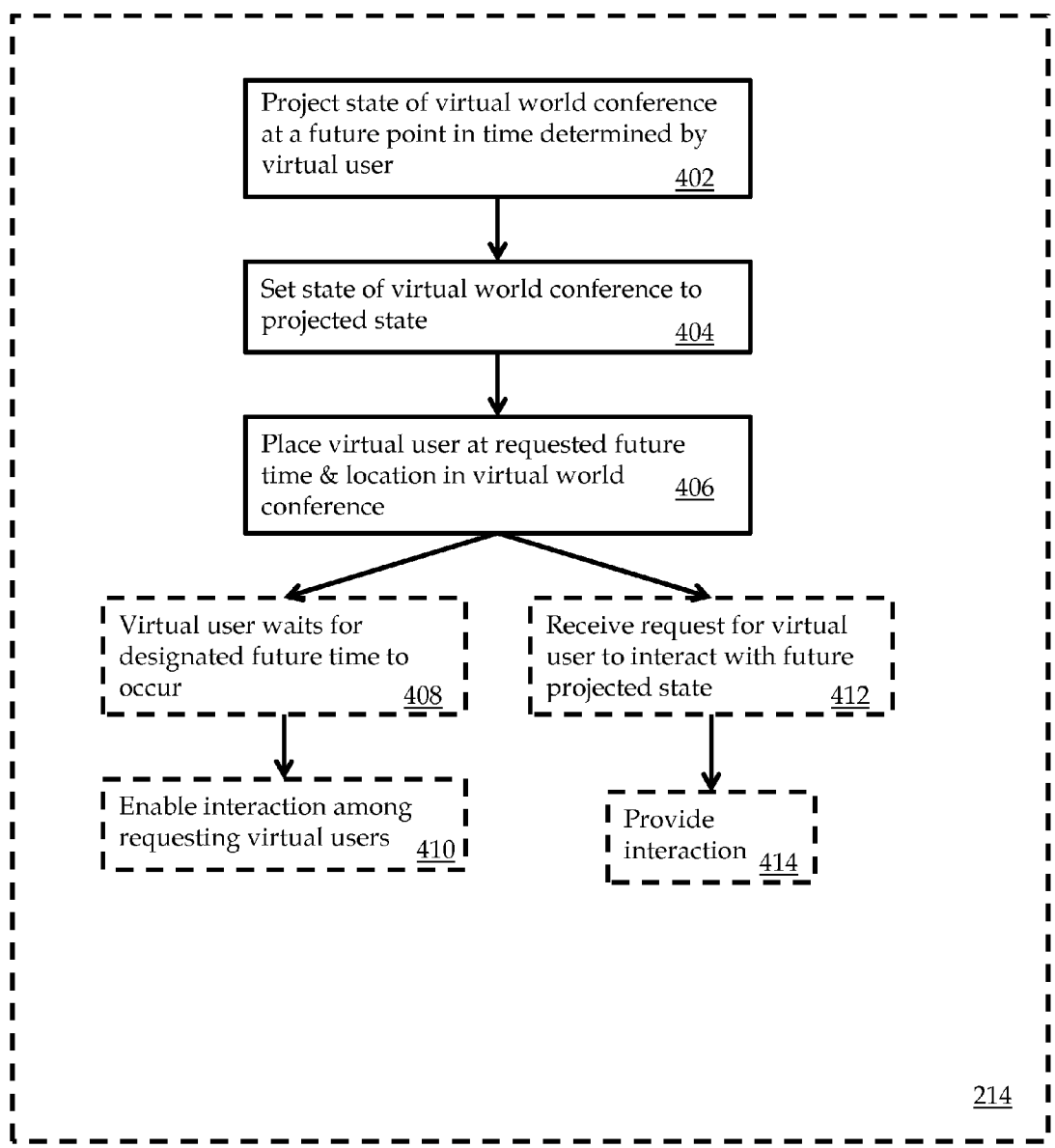
FIG. 4 illustrates a process to time shift to a future time in accordance with an embodiment of the present invention.

FIG. 4 illustrates at a relatively lower level of abstraction a process 400 in accordance with an embodiment of the present invention, which may be useful to implement step 214 of process 200. First, at step 402, the virtual world server 133 determines the state of the virtual world conference at the requested future time. If the virtual conference has concluded, the state may be determined by the events recorded up to that time. If the requested future time has not yet occurred in the virtual world conference, but is expected to occur, the virtual conference may be placed into a state synthesized or derived from the expected conference state at that time.

Next, at step 404, the virtual world server 133 sets the virtual conference and its then-live participants and objects to their respective states as determined in step 402.

Next, at step 406, the virtual user is placed at the requested future time and location in the virtual world conference. Control of process 400 may then proceed to either step 408 or step 412.

Optionally, at step 408, if the live virtual conference is still ongoing, the virtual user may wait for the designated future time to occur, as described earlier. For example, the virtual user may wait at a stage for a planned presentation to begin at a scheduled future time. Optionally, at step 410, the waiting virtual user may interact with other waiting virtual users or with other waiting avatars.

Optionally, at step 412, the virtual world server 133 may receive a request from the virtual user to interact with the conference state (including the state of avatars and other objects and participants) that is projected for the future time. Such interaction may be provided at step 414 so long as the interaction has minimal effect on the state of other avatars, objects, or participants beyond the immediate object of the interaction.

Embodiments of the present invention include a system having one or more processing units coupled to one or more memories. The one or more memories may be configured to store software that, when executed by the one or more processing unit, implements processes described above.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to provide a conference environment, comprising:
    establishing a live conference, by use of a conference server;
    recording, in a memory coupled to the conference server, events related to live participants in the live conference, wherein the live participants are communicatively coupled to the conference server;
    receiving, by the conference server, a request from a first user to experience the conference at a predetermined conference time that is different than a present real time, wherein the conference server may allow the first user to feed the conference server with a primary historic stream and also a stream of selected participants;
    retrieving from the memory, by the conference server, events related to live participants that occurred no later than the predetermined conference time;
    restoring, by the conference server, a conference state based upon the retrieved events, wherein the conference state may include at least a location, an appearance, an orientation, a direction and speed of travel, a direction of vision, an active conversation, or a location of the live participants within their media; and
    providing, by the conference server, an interaction responsive to the conference state and the first user, in order to produce the conference environment.

2. The method of claim 1, wherein:
    the conference comprises a virtual world conference;
    the first user comprises a first virtual user;
    the conference server comprises a virtual world server; and
    the conference environment comprises a virtual world conference environment.

3. The method of claim 1, wherein the predetermined conference time is a time previous to a present real time.

4. The method of claim 1, wherein the predetermined conference time is a future time compare to a present real time.

5. The method of claim 2, wherein the conference state is further responsive to a second virtual user.

6. The method of claim 5, wherein the conference server provides a mutual interaction between the first virtual user and the second virtual user.

7. The method of claim 2, further comprising the step of extrapolating a point of view presented to the first virtual user from available points of view recorded in the virtual world conference.

8. The method of claim 2, further comprising the step of synthesizing a point of view presented to the first virtual user from events related to one or more live participants.

9. The method of claim 8, wherein the synthesized point of view excludes private conversations among one or more live participants.

10. The method of claim 2, wherein the virtual world server provides a response interaction between the first virtual user and an avatar representing a live participant.

11. The method of claim 2, wherein an avatar of the first virtual user is rendered differently than an avatar representing a live participant.

12. The method of claim 1, further comprising the step of providing, by the conference server, a guided tour of the conference to the first user.

13. The method of claim 2, further comprising the step of generating, by the virtual world server, one or more new events not synthesizable only from recorded events, the new events based upon an interaction between a recorded event and the first virtual user.

14. The method of claim 13, wherein the one or more new events do not interfere with other events recorded in the virtual world conference.

15. The method of claim 13, wherein the virtual world server utilizes configurable limits on the step of generating one or more new events.

16. The method of claim 2, wherein the virtual world server enables the first virtual user to persistently modify a conference state, and a second virtual user is responsive to the modified conference state.

17. The method of claim 1, further comprising the step of providing, by the conference server, a capability for the first user to search for a predetermined item in a history of the live conference.

18. The method of claim 1, wherein a recorded events related to the live participants comprises one or more of an audio/video media stream and a shared information content.

* * * * *